United States Patent
Nagata et al.

(10) Patent No.: US 6,764,399 B2
(45) Date of Patent: Jul. 20, 2004

(54) PORTABLE TERMINAL APPARATUS, A GAME EXECUTION SUPPORT APPARATUS FOR SUPPORTING EXECUTION OF A GAME, AND COMPUTER READABLE MEDIUMS HAVING RECORDED THEREON PROCESSING PROGRAMS FOR ACTIVATING THE PORTABLE TERMINAL APPARATUS AND GAME EXECUTION SUPPORT APPARATUS

(75) Inventors: Akihiko Nagata, Tokyo (JP); Shigeru Fukutake, Tokyo (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 09/903,574

(22) Filed: Jul. 13, 2001

(65) Prior Publication Data

US 2002/0016203 A1 Feb. 7, 2002

(30) Foreign Application Priority Data

Aug. 2, 2000 (JP) ................................. P 2000-234512

(51) Int. Cl.$^7$ ............................ A63F 13/00; G06F 14/00
(52) U.S. Cl. ............................................. 463/35; 463/1
(58) Field of Search ................................ 463/35, 34, 1, 463/31, 43, 44, 37, 42, 49, 41; 84/600

(56) References Cited

U.S. PATENT DOCUMENTS

| 5,092,216 | A | | 3/1992 | Wadhams |
| RE35,314 | E | * | 8/1996 | Logg ............................. 463/2 |
| 6,296,570 | B1 | * | 10/2001 | Miyamoto et al. ............ 463/35 |
| 6,416,411 | B1 | * | 7/2002 | Tsukahara ..................... 463/35 |
| 6,435,969 | B1 | * | 8/2002 | Tanaka et al. ................. 463/44 |
| 6,464,585 | B1 | * | 10/2002 | Miyamoto et al. ............ 463/35 |

FOREIGN PATENT DOCUMENTS

| KP | 2000-0012685 | 3/2000 |
| TW | 10-2001-0041826 | 3/2003 |

* cited by examiner

*Primary Examiner*—Chen Wen Jiang
(74) *Attorney, Agent, or Firm*—Sughrue Mion, PLLC

(57) ABSTRACT

A game production is effected by utilization of a ringing melody registered in a portable terminal apparatus. With reference to a fruit image table (152), a processing section (110) fetches a fruit image corresponding to a ringing melody number assigned to a ringing melody which has been selected previously in accordance with an instruction. The thus-fetched fruit image is provided within a background image (1200) in a step (S1406). Accordingly, the processing section (110) displays the fruit corresponding to the selected ringing melody within a game screen. A production of an image can be controlled in accordance with the selected ringing melody.

18 Claims, 10 Drawing Sheets

FIG. 5

| PERSONAL ID | RINGING MELODY ID 0001 | | | RINGING MELODY ID 0002 | | | .... |
|---|---|---|---|---|---|---|---|
| 00000001 | ITEM 1 | ........ | ITEM 100 | ITEM 1 | ........ | ITEM 100 | .... |
| | 0 → 1 | ........ | 0 | 0 | ........ | 0 | .... |
| ⋮ | ⋮ | | ⋮ | ⋮ | | ⋮ | ⋮ |

| RINGING MELODY NO. | RINGING MELODY ID | TITLE OF RINGING MELODY | MUSICAL INFORMATION |
|---|---|---|---|
| 1 | 0001 | A | C |
| ⋮ | ⋮ | ⋮ | ⋮ |

151

| RINGING MELODY NO. | FRUIT IMAGE |
|---|---|
| 1 | A |
| ⋮ | ⋮ |

152

BANANAS | GRAPES | STRAWBERRIES | CHERRIES | PINEAPPLES

| FRUITS | SCORE FOR TRANSFORMATION 1 | SCORE FOR TRANSFORMATION 2 |
|---|---|---|
| A | x | x + 3 |
| ⋮ | ⋮ | ⋮ |

153

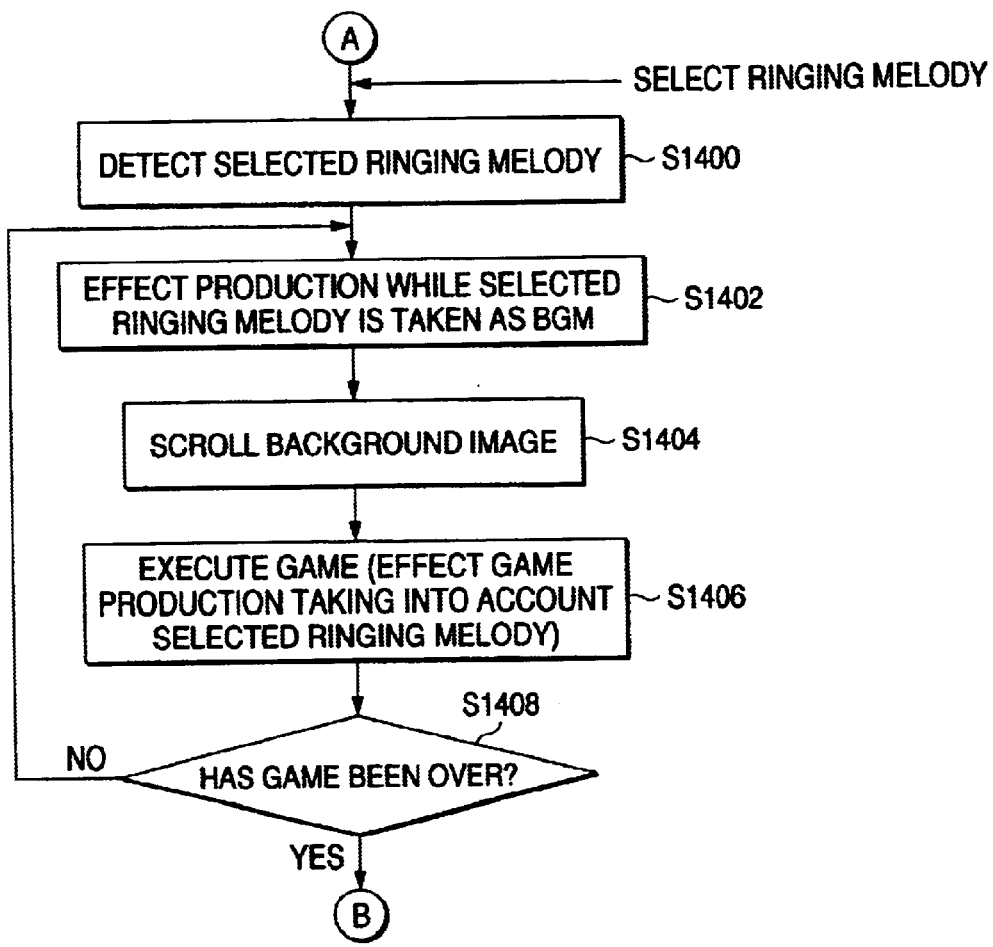

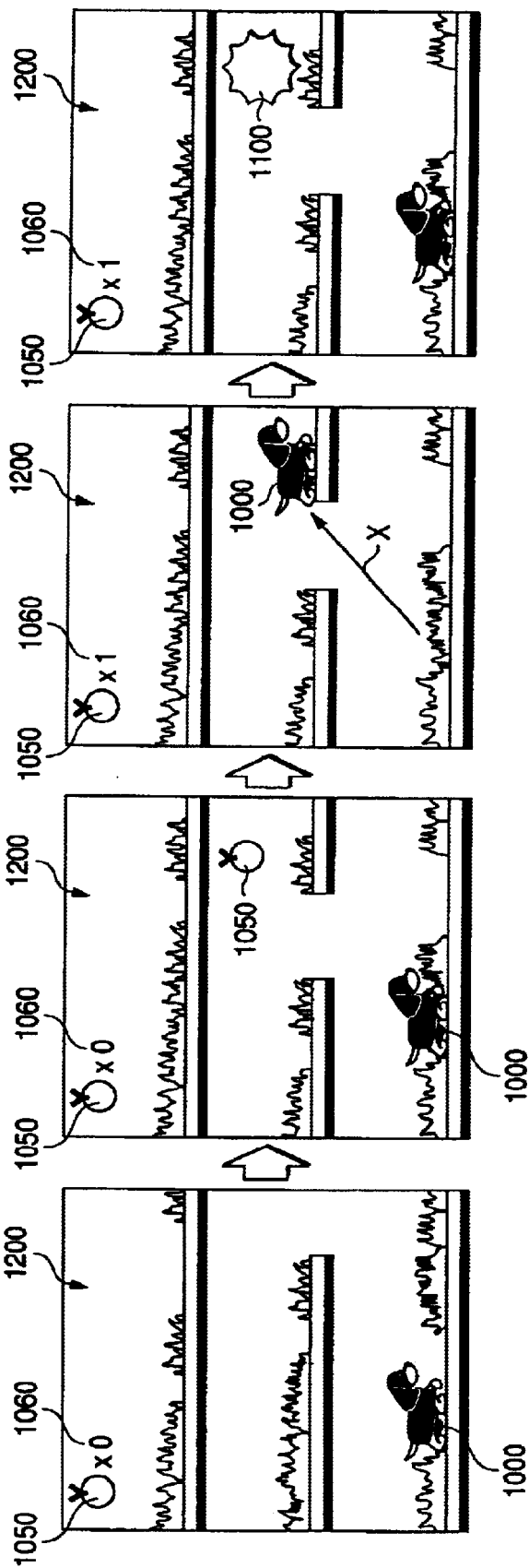

PORTABLE TERMINAL APPARATUS, A GAME EXECUTION SUPPORT APPARATUS FOR SUPPORTING EXECUTION OF A GAME, AND COMPUTER READABLE MEDIUMS HAVING RECORDED THEREON PROCESSING PROGRAMS FOR ACTIVATING THE PORTABLE TERMINAL APPARATUS AND GAME EXECUTION SUPPORT APPARATUS

BACKGROUND OF THE INVENTION

1. Field of the Invention

The present invention relates to a portable terminal apparatus which enables a player to play a game, and relates to a recording medium, such as a computer readable medium, having recorded thereon a processing program for activating the portable terminal apparatus. Further, the present invention relates to a game execution support apparatus for supporting execution of a game, and relates to a recording medium, such as a computer readable medium, having recorded thereon a processing program for activating the game execution support apparatus.

The present application is based on Japanese Patent Application No. 2000-234512, which is incorporated herein by reference.

2. Description of the Related Art

There has hitherto been proposed a system which enables a player to play a game while information is exchanged bidirectionally between a server and a portable terminal apparatus, such as a portable cellular phone etc. Games to be executed by a system of this type include a variety of battle-type games, such as an othello (reversi) game, in which an owner of a portable cellular phone plays a game with a server. There has also been proposed another portable terminal apparatus which does not effect bi-directional communication of information between a portable terminal apparatus and a server at all times during the course of a battle. However, the portable terminal apparatus accesses the server and downloads into a portable cellular phone an operation program required for executing a game, thereby enabling the owner to enjoy playing a game. Techniques for enabling the portable terminal apparatus of this type to execute a game have developed recently as a result of a recent IT revolution.

Even when an attempt has been made to enable a player to play a game through use of a portable terminal apparatus by way of putting IT techniques to full use, in actuality as a player accumulates rich experience in games, such the player becomes less interested in games. Hence, it has been desired to enable sustainment of the player's interest in games by a contrivance peculiar to the portable terminal apparatus.

SUMMARY OF THE INVENTION

The present invention has been conceived to solve such a problem in the above-described portable terminal apparatus. Thus, the present invention is aimed at providing a portable terminal apparatus in which a game is produced by utilization of music data registered in the portable terminal apparatus, and further aimed at providing a recording medium, such as a computer readable medium, having recorded thereon a processing program for activating the portable terminal apparatus. Moreover, the present invention is aimed at providing a game execution support apparatus for supporting execution of a game, and further aimed at providing a recording medium, such as a computer readable medium, having recorded thereon a processing program for activating the game execution support apparatus.

To solve the above problem, according to a first aspect of the present invention, there is provided a portable terminal apparatus which comprises a music data registration device in which a plurality of distributed music data sets are registered, a storage device which stores game information distributed from a game execution support apparatus which distributes game information including a game operation program, and a control device which causes a game to proceed by executing the game operation program, and which effects a game production in consideration of music data which have been selected from the plurality of music data sets in accordance with an instruction.

In accordance with the first aspect of the present invention, the control device causes a game to proceed by executing an operation program. Further, in consideration of music data selected from among music data sets, a game production is effected. Accordingly, a game production is effected in accordance with a ringing melody, thus sustaining the player's interest in the game.

According to a second aspect of the present invention, the portable terminal apparatus may further comprise a game screen on which a game image is displayed, and an operation device which is operated to control a character in the game image, wherein the control device causes the game screen to display in a background image of the game image a display object which is to be acquired by the character, and the control device causes the background image to scroll in a predetermined direction, wherein when the display object is acquired by the character in accordance with an operation of the character performed by the operation device, the control device causes the game to proceed such that a score for the game is increased, and wherein when the character is caused to perform an action colliding with a specific display object, the control device causes the game to be terminated.

According to a third aspect of the present invention, the control device may include a transformer which transforms the character when the number of display objects acquired by the character exceeds a predetermined number.

According to a fourth aspect of the present invention, the predetermined number is set according to a type of the display object.

According to a fifth aspect of the present invention, preferably, based on the selected music data, the control device controls a background music for the game in progress.

According to a sixth aspect of the present invention, preferably, the control device causes the game screen thereon to display the display object corresponding to the selected music data.

According to a seventh aspect of the present invention, the control device may include a transmitter which transmits, to the game execution support apparatus, a control signal which enables acquisition of game information used for the game and corresponding to the selected music data when the number of display objects acquired by the character exceeds a predetermined number.

According to an eighth aspect of the present invention, the control device may effect a wait screen display using game information transmitted from the game execution support apparatus.

According to a ninth aspect of the present invention, the music data may be data on at least one ringing melody.

Furthermore, to solve the above problem, according to a tenth aspect of the present invention, there is provided a game execution support apparatus which comprises a distributor which distributes, in accordance with a distribution request output from a portable terminal apparatus, game information including a game operation program required for enabling execution of a game, and a receiver which receives a control signal transmitted from the portable terminal apparatus and enabling acquisition of game information used for a game corresponding to music data which has been selected in accordance with an instruction, wherein the distributor distributes the game information to the portable terminal apparatus in response to receipt of the control signal.

In accordance with the tenth aspect of the present invention, game information can be acquired by operation of a portable terminal apparatus.

According to an eleventh aspect of the present invention, the music data may be data on at least one ringing melody.

Moreover, to solve the above problem, according to a twelfth aspect of the present invention, there is provided a computer readable medium having recorded thereon a processing program for activating a portable terminal apparatus having a music data registration device in which a plurality of distributed music data sets are registered. The processing program comprises a storage routine for storing game information distributed from a game execution support apparatus which distributes the game information including a game operation program, and an execution routine for executing the game operation program in order to proceed a game, and for effecting a game production in consideration of music data which have been selected from the plurality of music data sets in accordance with an instruction.

In accordance with the twelfth aspect of the present invention, when a computer executes a program, processing operations are performed, so that a production according to music data is effected, thereby sustaining the player's interest in the game.

According to a thirteenth aspect of the present invention, the music data may be data on at least one ringing melody.

The processing program, as described above, may be distributed from the game execution support apparatus to a desired portable terminal apparatus.

Furthermore, to solve the above problem, according to a fourteenth aspect of the present invention, there is provided a computer readable medium having recorded thereon a processing program for activating a game execution support apparatus which distributes game information including a game operation program for executing a game. The processing program comprises a first distribution routine for distributing the game information including the game operation program in accordance with a distribution request output from a portable terminal apparatus, a receipt routine for receiving a control signal which is transmitted from the portable terminal apparatus and enables acquisition of game information used for a game corresponding to music data which has been selected in accordance with an instruction, and a second distribution routine for distributing the game information to the portable terminal apparatus in response to receipt of the control signal.

In accordance with the fourteenth aspect of the present invention, when a computer executes a processing program, processing operations are performed, so that game information can be acquired by operation of a portable terminal apparatus.

According to a fifteenth aspect of the present invention, the music data may be data on at least one ringing melody.

The processing program, as described above, may be distributed from the game execution support apparatus to a desired portable terminal apparatus.

It should be noted that each of the aforementioned computer readable mediums includes a recording medium that enables reading and recording of-digital contents. More specifically, such the computer readable medium includes, for example, a semiconductor recording medium such as a ROM (i.e., Read Only Memory), a semiconductor IC (i.e., Integrated Circuit), etc., an optical recording medium such as a DVD-ROM (i.e., Digital Versatile Disk-Read Only Memory), a CD-ROM (i.e., Compact Disc-Read Only Memory), etc., a magnetic recording medium such as a flexible disk etc., and a magneto-optical recording medium such as an MO (i.e., Magneto Optical Disk) etc.

BRIEF DESCRIPTION OF THE DRAWINGS

The above and other objects and advantages of the present invention will become more apparent by describing in detail a preferred embodiment thereof with reference to the accompanying drawings, wherein:

FIG. 5 is a descriptive view showing an item table 351;

FIG. 6 is a descriptive view showing a ringing melody registration table 151;

FIG. 14 is a flowchart for explaining a game operation;

FIG. 15 is a descriptive view showing a display screen on the portable terminal apparatus 100;

FIGS. 16A through 16D are descriptive views for explaining a game operation;

DETAILED DESCRIPTION OF THE PREFERRED EMBODIMENT

1. Construction

Figure 1:
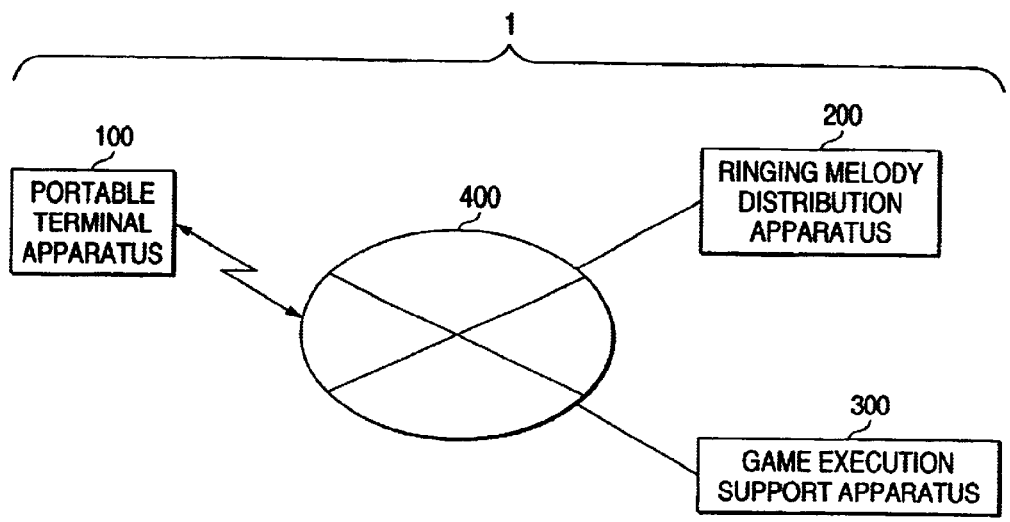
FIG. 1 is a block diagram of an embodiment of a game execution support system 1 according to the present invention.

FIG. 1 is a block diagram showing a preferred embodiment of a game execution support system according to the present invention. A game execution support system 1 comprises a portable terminal apparatus 100 owned by a user who acts as a player, a ringing melody distribution apparatus 200 for distributing ringing melodies, and a game execution support apparatus 300 for distributing game information, including a game operation program required for executing a game. The apparatuses 100, 200 and 300 are connected to a communications network 400. Naturally, a plurality of portable terminal apparatuses 100 can be used. For the sake of facilitating an explanation, one portable terminal apparatus 100 is employed. The communications network 400 may be embodied through use of, e.g., the Internet, private line, etc. The ringing melody distribution apparatus 200 and the game execution support apparatus 300 may be embodied as a single computer.

Figure 2:
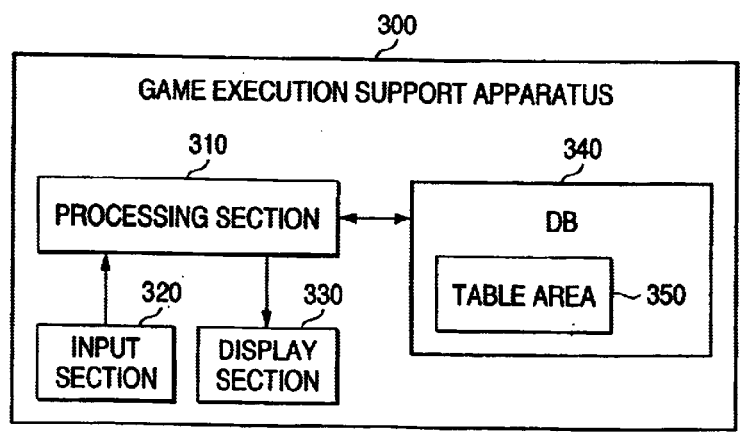
FIG. 2 is a block diagram of a game execution support apparatus 300.

FIG. 2 is a block diagram showing the game execution support apparatus 300. The game execution support apparatus 300 comprises a processing section 310 which can be embodied in a-CPU etc. operating in accordance with a processing program, an input section 320 which can be embodied in an input device such as a mouse etc., a display section 330 which can be embodied in a display device such as a CRT (i.e., Cathode-Ray Tube) etc., and a database (DB) 340 which can be embodied in a hard disk drive etc. A table region 350 is formed in the DB 340, and lookup on and updating of a table stored in the table region 350 are performed by the processing section 310.

FIG. 5 is a descriptive view of an item table 351 stored in the table region 350. The item table 351 shown in FIG. 5 comprises personal IDs which are identifiers assigned to respective users (players), a plurality of ringing melody IDs which are identifiers assigned to ringing melodies, and a flag showing whether or not 100 items; that is, item 1 through item 100, which are set for each of ringing melodies, can be distributed. When a flag assumes "1," a corresponding item can be distributed. In contrast, when the flag assumes "0," a corresponding item cannot be distributed.

In an example shown in FIG. 5, in relation to a user assigned personal ID "00000001," a flag for item 100 allocated to a ringing ID "0001" cannot be distributed. Even in relation to a ringing melody ID "0001," a flag for item 1 has been changed from 0 to 1, and item 1 can be distributed.

Figure 3:
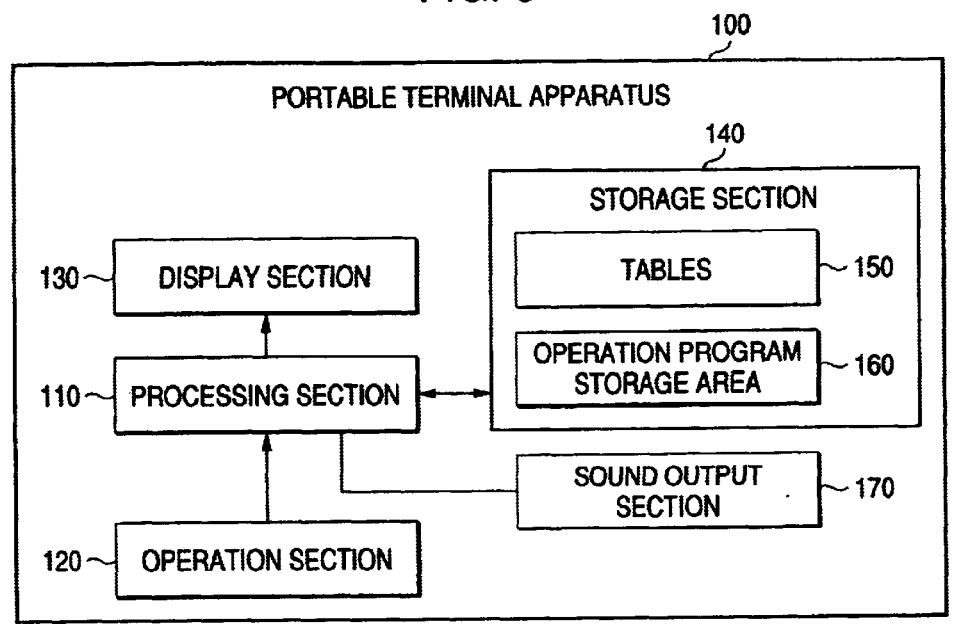
FIG. 3 is a block diagram of a portable terminal apparatus 100.

With reference to a block diagram shown in FIG. 3, the construction of the portable terminal apparatus 100 will be described. The portable terminal apparatus 100 comprises a processing section 110 which can be embodied in a CPU etc. operating in accordance with a processing program, an operation section 120 which can be embodied in control buttons etc., a display section 130 which can be embodied in a display device such as a color liquid-crystal display etc., a storage section 140 which can be embodied in a nonvolatile memory device etc., and a sound output section 170 which outputs sound. More specifically, items which are to be displayed on the display section 130 are selectively activated by actuation of buttons, thereby enabling the player to perform required operations.

Tables 150 are stored in the storage section 140 of the portable terminal apparatus 100, and an operation program storage area 160 for storing operation programs is formed in the storage section 140. Distributed operation programs are stored in the operation program storage area 160. Other character information items are stored in an area (not shown) in the storage section 140.

The portable terminal apparatus 100 can be embodied in a portable cellular phone, a compact, transportable information processor featuring mobility, or the like. Here, provided that the portable terminal apparatus 100 is embodied in a portable cellular phone, the system configuration shown in FIG. 1 must include an intermediary apparatus such as a base station etc. In order to facilitate comprehension of the principal feature of the present invention, the embodiment is described while an intermediary apparatus, such as a base station etc., is intentionally omitted.

Figures 7, 8, 9:
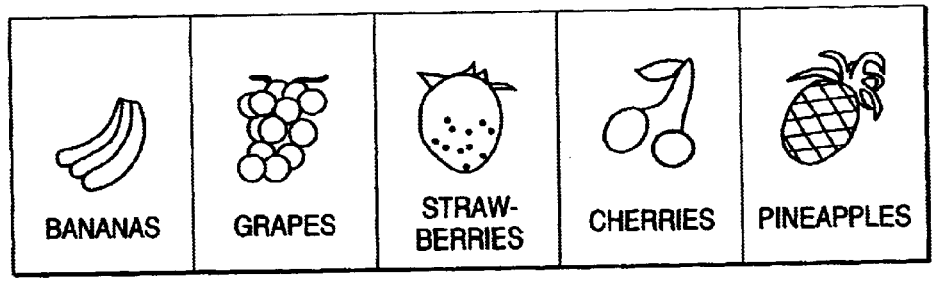
FIG. 7 is a descriptive view showing a fruit image table 152.
FIG. 8 is a descriptive view showing specific examples of fruit images.
FIG. 9 is a descriptive view of a character transformation table 153.

FIGS. 6, 7, and 9 are descriptive views of tables for explaining examples of the tables 150. A ringing melody registration table 151 shown in FIG. 6 stores ringing melody IDs assigned to ringing melodies distributed by the ringing melody distribution apparatus 200; titles of ringing melodies; and musical information, such that they are associated with each other. Further, ringing melody numbers sequentially assigned to melodies from number 1 by the processing section 110 are stored in the ringing melody registration table 151. The processing section 110 is constructed such that contents of the ringing melody registration table 151 are displayed in the form of a list on the display section 130, by operation of the operation section 120. In the example shown in FIG. 6, ringing melody ID "0001," the title of the ringing melody "A," and musical information "C" are appended to a corresponding ringing melody number "1," and these information items are stored in the ringing melody registration table 151.

A fruit image table 152 shown in FIG. 7 is for setting, for each melody number, a fruit, which serves as a display object to be acquired by a character during a later game operation. Ringing melody numbers and corresponding fruit images are stored in the fruit image table 152 so as to become associated with each other. A display object is changed within a game screen for each ringing melody for which selection been instructed, thereby enabling sustainment of the player's interest in a game to a much greater extent. FIG. 8 shows specific examples of fruit images. Bananas, grapes, strawberries, cherries, and pineapples are prepared as fruit images. Needless to say, the fruit images are not limited to these examples.

Figure 10A:
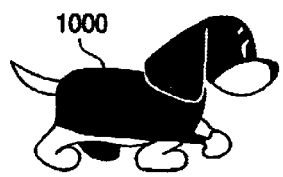
FIGS. 10A through 10C are descriptive views showing specific examples of character transformation.
Figure 10B:
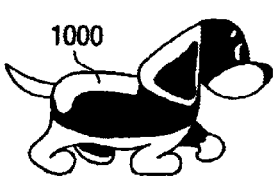
Figure 10C:
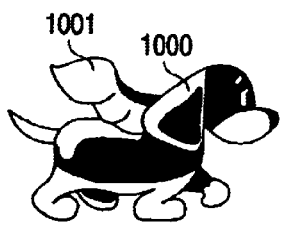

A character transformation table 153 shown in FIG. 9 stores kinds of fruits, a score for transformation 1, and a score for transformation 2 such that they are associated with each other. When a character to be described later has acquired fruits in a number equal to or exceeding the score for transformation 1 set for each fruit, the character undergoes first transformation. Further, when the character has acquired fruits in a number equal to or exceeding the score for transformation 2, the character undergoes second transformation. FIGS. 10A through 10C are specific examples of transformation of a character 1000. When the character 1000 (see FIG. 10A) has acquired fruits "A" in number equal to or exceeding the score "x" for transformation 1 (as shown in FIG. 9), the character 1000 is changed in color, as shown in FIG. 10B. Further, when the character 1000 that has undergone first transformation (see FIG. 10B) has acquired fruits "A" in number equal to or exceeding a score "x+3" for transformation 2, the character 1000 undergoes second transformation so as to acquire wings 1001, as shown in FIG. 10C.

Figure 4:
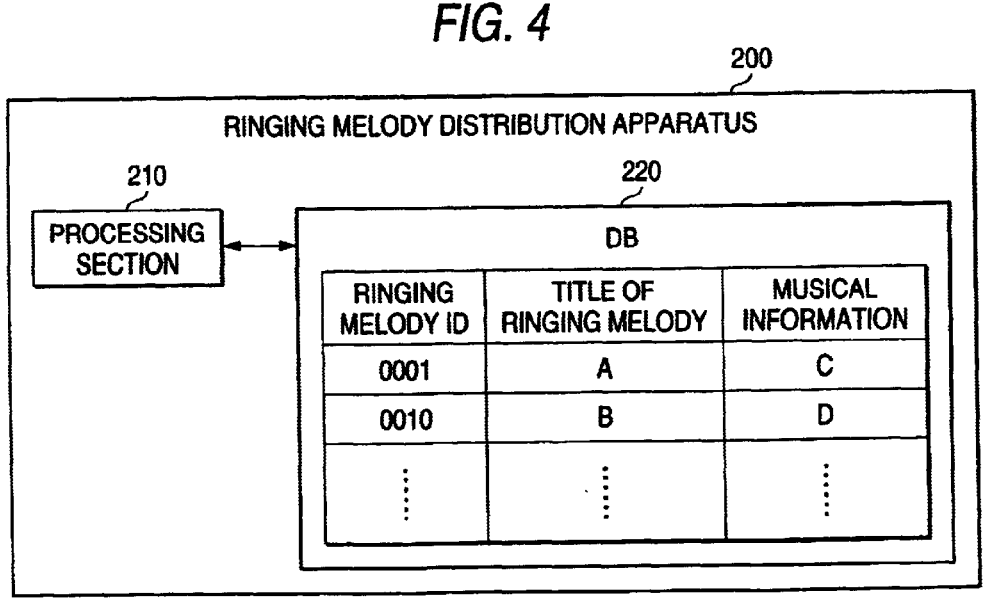
FIG. 4 is a block diagram of a ringing melody distribution apparatus 200.

With reference to a block diagram shown in FIG. 4, the configuration of the ringing melody distribution apparatus 200 will now be described. The ringing melody distribution apparatus 200 has a processing section 210 embodied in a CPU which operates in accordance with a processing program, and a DB 220 embodied in a hard disk drive. Ringing melody IDs assigned to ringing melodies; titles of ringing melodies; and musical information are stored in the DB 220 in such a way that they are associated with each other. The processing section 210 is arranged so as to perform lookup and updating of contents of the DB 220 in accordance with a distribution request.

2. Description of Operation

Figure 11:
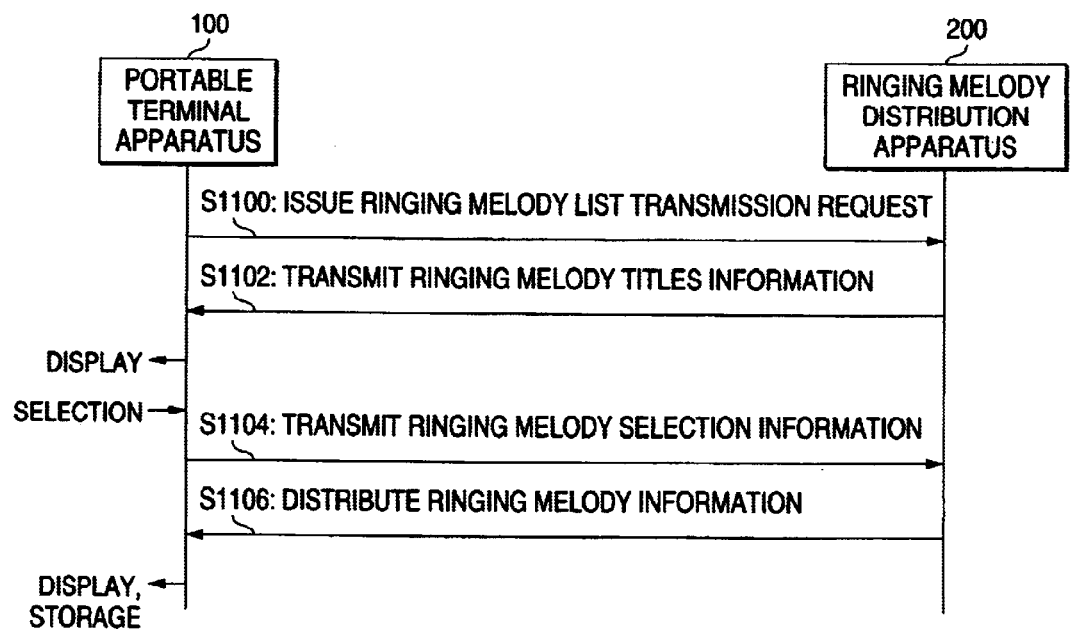
FIG. 11 is a descriptive view showing an operation for distributing a ringing melody.

A ringing melody distribution operation will be described with reference to a communications scenario shown in FIG. 11 and to diagrams showing transition in display screens of the display section 130 of the portable terminal apparatus 100 shown in FIG. 12.

3. Ringing Melody Distribution Operation

When a ringing melody list transmission instruction is issued by actuation of the operation section 120, the processing section 110 transmits a ringing melody list transmission request to the ringing melody distribution apparatus 200 (step S1100). In response to the request, the processing section 210 of the ringing melody distribution apparatus 200 retrieves titles of all ringing melodies stored in the DB 220 and transmits the thus-retrieved titles of the ringing melodies to the portable terminal apparatus 100 (step S1102).

Figure 12A:
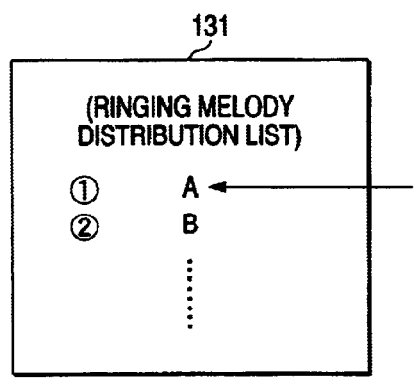
FIGS. 12A and 12B are descriptive views showing a display screen on the portable terminal apparatus 100.
Figure 12B:
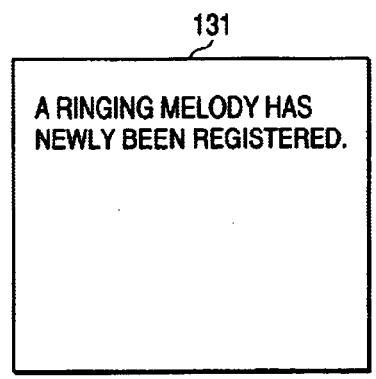
Figure 13:
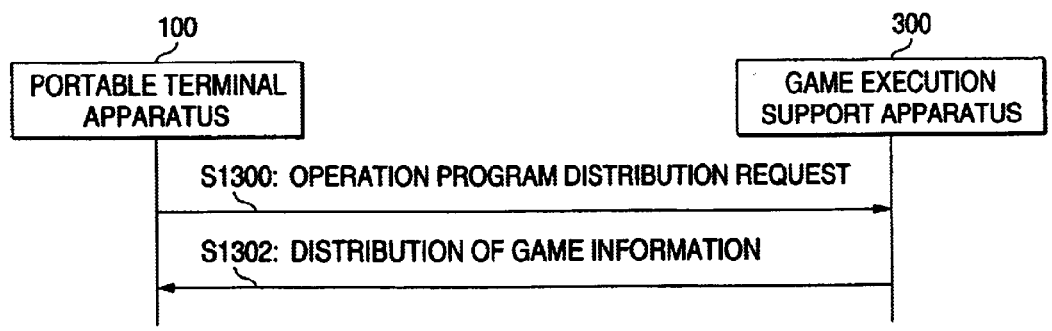
FIG. 13 is a descriptive view for explaining an operation for distributing an operation program.

In response to this, as shown in FIG. 12A, the processing section 110 displays titles of ringing melodies on the display area 131 of the display section 130 as a ringing melody distribution list. When a user selectively activates any one title of the ringing melody list by the operation section 120, the processing section 110 transmits to the ringing melody distribution apparatus 200 ringing melody selection information indicating the thus-selected ringing melody (step S1104). In response to transmission of information, the processing section 210 looks up information in the DB 220 and transmits to the portable terminal apparatus 100 a ringing melody ID assigned to the selected ringing melody, the title of the ringing melody, and musical information about the ringing melody (step S1106).

In response to the transmission operation, the processing section 110 adds a ringing melody number to the information and newly registers the information in the ringing melody registration table 151. Further, the processing section 110 displays on the display section 130 a message to the effect that the ringing melody has been registered, such as that shown in FIG. 12B. In this way, information pertaining to a desired ringing melody is registered in the ringing melody registration table 151.

4. Operation program distribution operation

Next will be described an operation program distribution operation for enabling a player to play a game. When an operation program distribution instruction is issued by actuation of the operation section 120, the processing section 110 transmits an operation program distribution request to the game execution support apparatus 300 (step S1300). Then, a processing section 310 of the game execution support apparatus 300 transmits to the portable terminal apparatus 100 a processing program (not shown) stored in a DB 340 or game information such as table information shown in FIG. 7 or 9 (step S1302).

The processing section 110 stores an operation program in the operation program storage area 160 and stores table information into the tables 150, thus constructing respective tables. Thereafter, the processing section 110 executes an operation program, thus effecting a game.

5. Game Operation

A game operation will be described with reference to a flowchart shown in FIG. 14. First, an instruction for displaying a registered ringing melody list is issued by actuation of the operation section 120 of the portable terminal apparatus 100. The processing section 110 looks up information in the ringing melody registration table 151 and displays a ringing melody number and the title of the melody on the display section 130 such that they are associated with each other. When any one of the ringing melody numbers is selected in this state, the processing section 110 detects the thus-selected ringing melody number and looks up information in the ringing melody registration table 151 (step S1400). During the course of a game, there is continuously performed an operation for outputting as background music a sound, which is to be output on the basis of the musical information corresponding to the thus-detected ringing melody number, from the sound output section 170 (step S1402). As a result, a production of a sound effect using the selectively instructed ringing melody can be controlled.

The processing section 110 performs an operation for scrolling a background image (step S1404) and executing a game (step S1406). FIGS. 16A through 16D are illustrations specifically describing the game. As a game proceeds from FIGS. 16A through 16D, time elapses. The processing section 110 causes the game screen to arrange (i.e., display), in a background image 1200, fruits which are display objects to be acquired by the character 1000. Further, the processing section 110 causes the background image 1200 to scroll from right to left in FIGS. 16A to 16D. At this time, in accordance with operating action on the operation section 120, the character 1000 can move in any one of the rightward direction, the leftward direction, and the upward direction (denoted by X in FIG. 16C; that is, a jump).

When the character 1000 is caused to act so as to acquire a fruit 1050, a score (1060) is increased. In contrast, if the character 1000 is caused to act so as to collide with a spider web, which is a specific display object, a game ends (when YES is selected in step S1408). Unless the game ends (i.e., when NO is selected in step S1408), processing pertaining to steps S1402 through S1408 go on. Consequently, a simple and enjoyable game can be effected by way of moving the character 1000 through actuation of the operation section 120 and acquiring the fruit 1050 scrolled in conjunction with the background image 1200.

During the course of progress in the game, the processing section 110 looks up information in the fruit image table 152, retrieves a fruit image corresponding to a ringing melody number assigned to the ringing melody for which selection has been instructed, and arranges the thus-retrieved fruit in the background image 1200. The processing section 110 displays within a game screen fruits corresponding to the selectively instructed ringing melody. Hence, a production of an image corresponding to the selectively instructed ringing melody can be controlled.

When the number of fruits acquired by the character 1000 equals or exceeds the score for first transformation, the processing section 110 causes the character 100 to transform with reference to the character transformation table 153. When the number of fruits acquired by the character 1000 equals or exceeds the score for second transformation, the processing section 110 causes the character 1000 to transform again, thus effecting a game. As a result, the player's interest in the game is sustained further. At this time, the score for first transformation and the score for second transformation are set according to the type of fruit. Hence, even when the character 1000 has a given capability, the character 1000 transforms during transformation periods which vary according to kinds of fruits. Accordingly, the nature of interest in a game is improved.

6. Item Acquisition Operation

Figure 17:
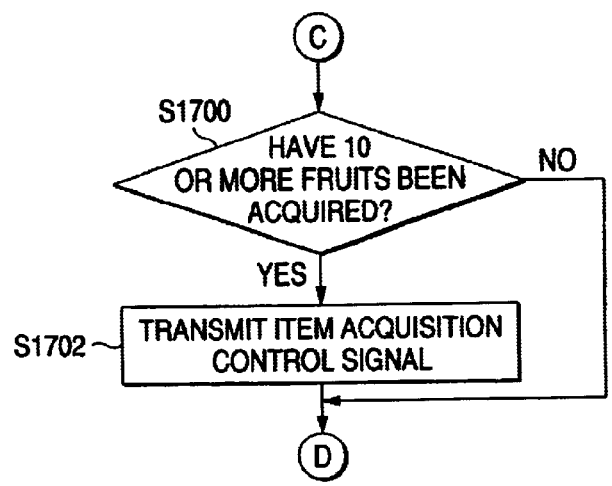
FIG. 17 is a flowchart for explaining an operation for acquiring items.

As shown in FIG. 17, the processing section 110 determines whether or not 10 or more fruits have been acquired. If fewer than 10 fruits have been acquired (when NO is selected in step S1700), processing is terminated. In contrast, if 10 or more fruits have been acquired (when YES is selected in step S1700), processing proceeds to step S1702, and a control signal for enabling acquisition of an item corresponding to the selectively instructed ringing melody is transmitted to the game execution support apparatus 300. At this time, the processing section 110 transmits a personal ID assigned to the owner of the portable terminal apparatus 100 and a ringing melody ID pertaining to the selectively instructed ringing melody while they are included in the control signal.

The processing section 310 of the game execution support apparatus 300 grasps, sequentially from item 1, an item flag which corresponds to the personal ID and the ringing melody ID, both having been transmitted and being stored in the item table 351. First, an item flag "0" is changed to "1." For instance, when a flag assigned to item 1 assumes "0," a flag corresponding to item 1 is changed from "0" to "1."

Figure 18:
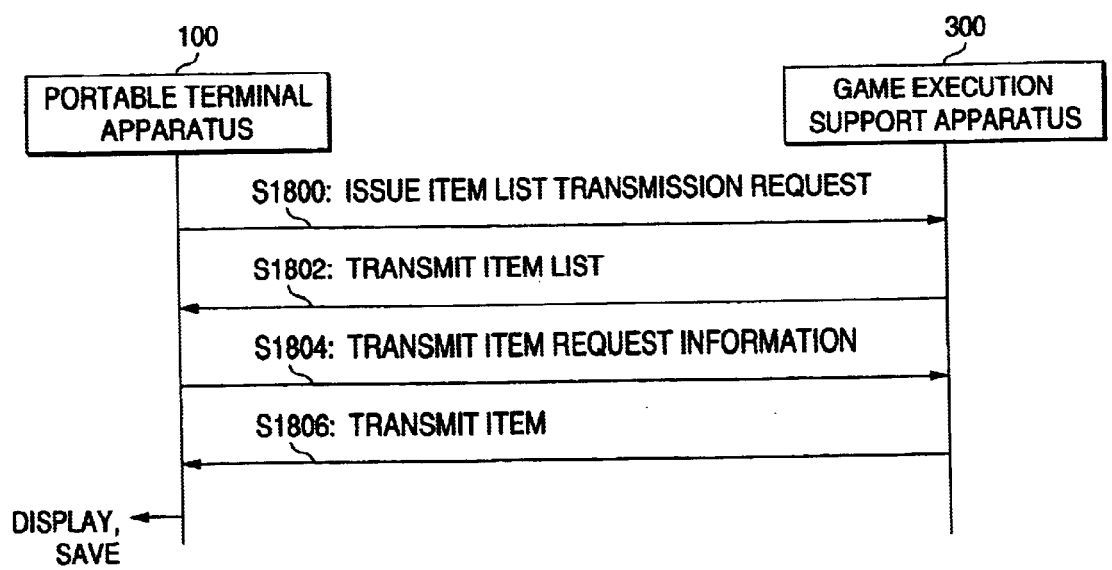
FIG. 18 is a descriptive view for explaining an operation for acquiring items.

An item acquisition operation will be described with reference to a communications scenario shown in FIG. 18 and to diagrams showing transition in display screens of the display section 130 of the portable terminal apparatus 100 shown in FIG. 19.

When an item list transmission instruction has been issued by actuation of the operation section 120, the processing section 110 transmits an item list transmission request to the game execution support apparatus 300 (step S1800). The processing section 310 of the game execution support apparatus 300 draws up a list of items which are assigned an item flag for 1 and belong to corresponding personal IDs stored in the item table 351, and the thus-prepared list is transmitted to the portable terminal apparatus 100 (step S1802).

Figure 19A:
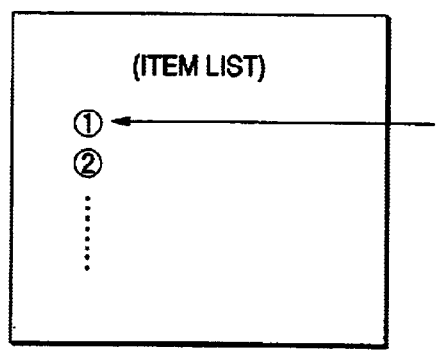
FIGS. 19A and 19B is a descriptive view showing a display screen on the portable terminal apparatus 100.

As shown in FIG. 19A, the processing section 310 displays the item list on the display section 300. For instance, in the example shown in FIG. 5, in relation to the user assigned ID "00000001, only a flag for item 1 corresponding to a ringing melody ID "0001" assumes "1." Hence, the title of item 1 is displayed on the display section 300. When the user issues an item request instruction by actuation of the operation section 120, the processing section 110 transmits item list request information to the game execution support apparatus 300 (step S1804). The processing section 310 of the game execution support apparatus 300 transmits the instructed item to the portable terminal apparatus 100 (step S1806).

Figure 19B:
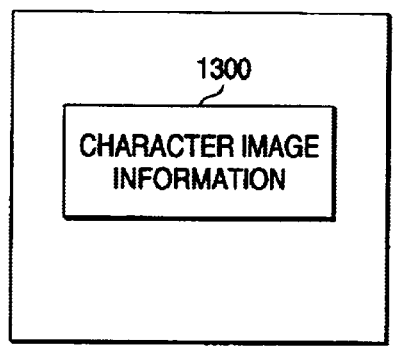

As shown in FIG. 19B, the processing section 110 displays details of the item on the display section 300. In this example, item 1 corresponds to image information about a certain character. Items include various substances, such as objects to be provided for a character within the game screen.

Thus, the processing section 310 receives a control signal so as to acquire an item according to a selectively instructed ringing melody transmitted from the portable terminal apparatus 100. As a result of receipt of the control signal, the processing section 310 enables distribution of an item to the portable terminal apparatus 100. Thus, an item can be acquired through actuation of the portable terminal apparatus 100. Further, the processing section 110 stores the thus-acquired item in a predetermined area on the storage section 140. During a normal operation in which a game is not effected, the item is read from the storage area and displays the item on the display section 130 as a wait screen display. This improves the user's desire for acquiring an item.

As has been described, in the embodiment, the processing section 310 causes a game to proceed by execution of an operation program. Further, in consideration of a ringing melody selected from among ringing melodies registered in the ringing melody registration table 151, a game production is effected. Hence, a game production is effected in accordance with a ringing melody, thus sustaining the player's interest in the game.

Figure 20:
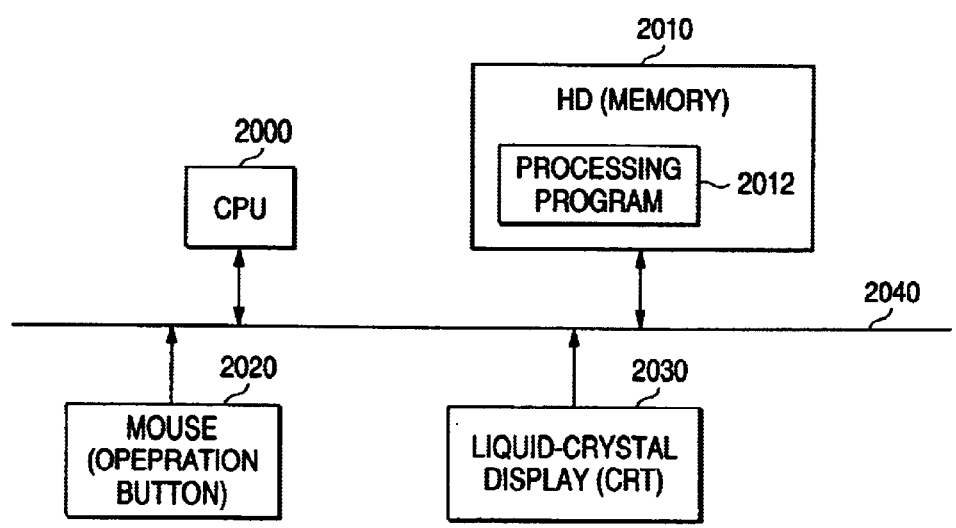
FIG. 20 is a hardware configuration of individual pieces of each apparatus.

FIG. 20 is a block diagram showing hardware configuration of the principal sections of the respective pieces of each apparatus shown in FIG. 1. The configuration shown in FIG. 20 comprises a CPU 2000, a hard disk drive or memory 2010 serving as a recording medium having recorded thereon a processing program 2012, an operation button or mouse 2020, and a liquid-crystal display or CRT 2030. They are interconnected by a bus 2040 so as to be able to mutually exchange required information. As a result of the CPU 2000 executing the processing program 2012, operations set forth can be implemented.

The embodiment has described utilization of a ringing melody for a portable cellular phone. Alternatively, the present invention may be applied to an information terminal apparatus, such as a non-transportable game machine or desk-top computer, thereby enabling a user to play a game by utilization of distributed music data. Although music data may correspond to ringing melodies described in connection with the embodiment, the music data are not limited to ringing melodies and include arbitrary music data set so as not to ring at the time of a call alert. Further, music data are not limited to music and may include data which can be perceived as sound: for example, sound of babbles of a brook, chirping of insects, or human voice. Although game information may correspond to items (e.g., images of fruits) described in connection with the embodiment, the game information is not limited to such items. For example, game information include arbitrary image data; more appropriately, arbitrary information which can be distributed and are to be used for a game, such as game background images or character information pertaining to a game.

The present invention is not limited to the specific above-described embodiment. For example, at the time of receipt or transmission of information by or from the portable terminal apparatus 100, the user may be prompted to perform operations by audible notification. For example, a user may not be allowed to perform a round of operations without entering a password by the portable terminal apparatus 100. For example, the number of types of characters and fruits may be increased. For example, objects to be acquired may be embodied in forms other than fruits.

As has been described above, according to the present invention, a game is caused to proceed by way of executing an operation program. Further, a-game production is effected in consideration of music data selected from music data sets. Hence, there is yielded an advantage of the player's interest in a game being sustained as a result of a game production being performed in accordance with music data.

It is contemplated that numerous modifications may be made to the portable terminal apparatus, the game execution support apparatus, and the computer readable mediums having recorded thereon the processing programs for activating the portable terminal apparatus and the game execution support apparatus, of the present invention without departing from the spirit and scope of the invention as defined in the following claims.

What is claimed is:

1. A portable terminal apparatus, comprising:
   a music data registration device in which a plurality of distributed music data sets are registered;
   a storage device which stores game information distributed from a game execution support apparatus which distributes game information including a game operation program; and
   a control device which causes a game to proceed by executing the game operation program, and which effects a game production in consideration of music data which have been selected from the plurality of music data sets in accordance with an instruction.

2. The portable terminal apparatus of claim 1, further comprising:
   a game screen on which a game image is displayed; and
   an operation device which is operated to control a character in the game image,
   wherein the control device causes the game screen to display in a background image of the game image a display object which is to be acquired by the character, and the control device causes the background image to scroll in a predetermined direction,
   wherein when the display object is acquired by the character in accordance with an operation of the character performed by the operation device, the control device causes the game to proceed such that a score for the game is increased, and
   wherein when the character is caused to perform an action colliding with a specific display object, the control device causes the game to be terminated.

3. The portable terminal apparatus of claim 2, wherein the control device includes a transformer which transforms the character when the number of display objects acquired by the character exceeds a predetermined number.

4. The portable terminal apparatus of claim 3, wherein the predetermined number is set according to a type of the display object.

5. The portable terminal apparatus of claim 4, wherein based on the selected music data, the control device controls a background music for the game in progress.

6. The portable terminal apparatus of claim 4, wherein the control device causes the game screen thereon to display the display object corresponding to the selected music data.

7. The portable terminal apparatus of claim 4, wherein the control device includes a transmitter which transmits, to the game execution support apparatus, a control signal which enables acquisition of game information used for the game and corresponding to the selected music data when the number of display objects acquired by the character exceeds a predetermined number.

8. The portable terminal apparatus of claim 7, wherein the control device effects a wait screen display using game information transmitted from the game execution support apparatus.

9. The portable terminal apparatus of claim 3, wherein based on the selected music data, the control device controls a background music for the game in progress.

10. The portable terminal apparatus of claim 3, wherein the control device causes the game screen thereon to display the display object corresponding to the selected music data.

11. The portable terminal apparatus of claim 3, wherein the control device includes a transmitter which transmits, to the game execution support apparatus, a control signal which enables acquisition of game information used for the game and corresponding to the selected music data when the number of display objects acquired by the character exceeds a predetermined number.

12. The portable terminal apparatus of claim 11, wherein the control device effects a wait screen display using game information transmitted from the game execution support apparatus.

13. The portable terminal apparatus of claim 2, wherein based on the selected music data, the control device controls a background music for the game in progress.

14. The portable terminal apparatus of claim 2, wherein the control device causes the game screen thereon to display the display object corresponding to the selected music data.

15. The portable terminal apparatus of claim 2, wherein the control device includes a transmitter which transmits, to the game execution support apparatus, a control signal which enables acquisition of game information used for the game and corresponding to the selected music data when the number of display objects acquired by the character exceeds a predetermined number.

16. The portable terminal apparatus of claim 15, wherein the control device effects await screen display using game information transmitted from the game execution support apparatus.

17. The portable terminal apparatus of claim 1, wherein based on the selected music data, the control device controls a background music for the game in progress.

18. The portable terminal apparatus of claim 1, wherein the music data is data on at least one ringing melody.

* * * * *